US011250650B2

(12) United States Patent
Kawashima et al.

(10) Patent No.: US 11,250,650 B2
(45) Date of Patent: Feb. 15, 2022

(54) RIDE-HAILING VEHICLE IDENTIFICATION

(71) Applicant: HONDA MOTOR CO., LTD., Tokyo (JP)

(72) Inventors: Kiyotaka Kawashima, Los Angeles, CA (US); Ting Zhang, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 16/353,616

(22) Filed: Mar. 14, 2019

(65) Prior Publication Data

US 2020/0294328 A1  Sep. 17, 2020

(51) Int. Cl.
*G07C 5/02* (2006.01)
*G01C 21/28* (2006.01)

(52) U.S. Cl.
CPC .............. *G07C 5/02* (2013.01); *G01C 21/28* (2013.01)

(58) Field of Classification Search
CPC .................................. G07C 5/02; G01C 21/28
See application file for complete search history.

(56) References Cited

U.S. PATENT DOCUMENTS

| | | | |
|---|---|---|---|
| 6,931,308 B2 | 8/2005 | Read | |
| 8,612,273 B2 | 12/2013 | Johnson | |
| 8,972,177 B2* | 3/2015 | Zheng | ................ H04N 21/4126 701/454 |
| 9,400,185 B2 | 7/2016 | Tanaka et al. | |
| 10,104,494 B2 | 10/2018 | Bellens et al. | |
| 2009/0012955 A1 | 1/2009 | Chu et al. | |
| 2010/0185384 A1* | 7/2010 | Naito | ................. G01C 21/3469 701/532 |
| 2012/0130636 A1 | 5/2012 | Westerlage | |
| 2013/0054281 A1 | 2/2013 | Thakkar et al. | |
| 2013/0164715 A1* | 6/2013 | Hunt | ...................... G01S 19/13 434/65 |

(Continued)

FOREIGN PATENT DOCUMENTS

CN 103646560 B 12/2015
WO WO 2018/134417 A1 7/2018

OTHER PUBLICATIONS

Machine Translation of JP-2019066950-A, Apr. 2019, Nakae Shigeru (Year: 2019).*

*Primary Examiner* — James J Lee
*Assistant Examiner* — Tawri M Matsushige
(74) *Attorney, Agent, or Firm* — Arent Fox LLP (57) ABSTRACT

The present disclosure generally relates to methods and systems for determining usage of a vehicle. A vehicle monitoring system may include a memory, at least one processor coupled to the memory, and a sensor system that generates vehicle trip data. The system may periodically determine a location of the vehicle during a trip while an ignition of the vehicle remains on. The system may determine that a duration of the trip is at least a threshold duration. The system may determine a direction of travel for segments between consecutive locations during the trip. The system may determine a ratio of a most common direction of travel for the trip to at least a second most common direction of travel for the trip. The system may determine that the vehicle has been used for commercial purposes in response to the ratio being less than a threshold ratio.

16 Claims, 10 Drawing Sheets

(56) References Cited

U.S. PATENT DOCUMENTS

| | | | |
|---|---|---|---|
| 2014/0195272 A1* | 7/2014 | Sadiq | G06Q 40/08 |
| | | | 705/4 |
| 2016/0034845 A1* | 2/2016 | Hiyama | G06Q 30/0633 |
| | | | 705/7.15 |
| 2016/0035042 A1* | 2/2016 | Bomze | G06Q 40/12 |
| | | | 705/30 |
| 2016/0318531 A1 | 11/2016 | Johnson et al. | |
| 2016/0364812 A1* | 12/2016 | Cao | G06Q 50/30 |
| 2018/0121847 A1* | 5/2018 | Zhao | G06Q 10/06312 |
| 2018/0130095 A1 | 5/2018 | Khoury | |
| 2018/0286236 A1* | 10/2018 | Mazzola | G01C 21/3664 |
| 2020/0018976 A1 | 1/2020 | Van Wiemeersch et al. | |
| 2020/0062274 A1* | 2/2020 | Kowal | G07C 5/008 |
| 2020/0164891 A1* | 5/2020 | Bender | B60W 50/0097 |
| 2020/0258138 A1* | 8/2020 | Ahmed | B60W 40/09 |

\* cited by examiner

FIG. 14 ated with a driving pattern showing a vehicle being used for commercial purposes.

RIDE-HAILING VEHICLE IDENTIFICATION

TECHNICAL FIELD

The present disclosure relates to monitoring vehicle usage, and more particularly to determining whether a vehicle is being used for commercial purposes.

BACKGROUND

Ride hailing applications may allow a passenger to arrange a ride from a driver operating a private vehicle. Typically, the passenger accesses a third party application via a mobile device to request the ride by specifying a pickup location and/or a destination. The driver also accesses a third party application via a mobile device to accept the request and navigate to the passenger and the destination. Additionally, the third party application may provide payment services for the passenger to pay the driver.

In some cases, a driver participating in a ride hailing application may not be the owner of the vehicle. For example, the vehicle may be leased or rented by the driver. In another example, the vehicle may be provided to the driver (e.g., by an employer) for a different purpose. The use of the vehicle for commercial purposes may violate an agreement between the driver and the owner of the vehicle. In other scenarios, the driver may have specified personal use of the vehicle when acquiring insurance.

In view of the foregoing, it may be advantageous to determine whether a vehicle is being used for commercial purposes. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides an example method of determining usage of a vehicle. The method may include periodically determining a location of the vehicle during a trip while an ignition of the vehicle remains on. The method may include determining that a duration of the trip is at least a threshold duration. The method may include determining a direction of travel for segments between consecutive locations during the trip. The method may include determining a ratio of a most common direction of travel for the trip to at least a second most common direction of travel for the trip. The method may include determining that the vehicle has been used for commercial purposes in response to the ratio being less than a threshold ratio.

In another aspect, the disclosure provides an apparatus for determining usage of a vehicle. The apparatus may include a memory and at least one processor coupled to the memory. The at least one processor may be configured to periodically determine a location of the vehicle during a trip while an ignition of the vehicle remains on. The at least one processor may be configured to determine that a duration of the trip is at least a threshold duration. The at least one processor may be configured to determine a direction of travel for segments between consecutive locations during the trip. The at least one processor may be configured to determine a ratio of a most common direction of travel for the trip to at least a second most common direction of travel for the trip. The at least one processor may be configured to determine that the vehicle has been used for commercial purposes in response to the ratio being less than a threshold ratio.

In another aspect, the disclosure provides a non-transitory computer-readable medium storing computer executable code to determine usage of a vehicle. The non-transitory computer-readable medium may include code to determine a periodic location of the vehicle during a trip while an ignition of the vehicle remains on. The non-transitory computer-readable medium may include code to determine that a duration of the trip is at least a threshold duration. The non-transitory computer-readable medium may include code to determine a direction of travel for segments between consecutive locations during the trip. The non-transitory computer-readable medium may include code to determine a ratio of a most common direction of travel for the trip to at least a second most common direction of travel for the trip. The non-transitory computer-readable medium may include code to determine that the vehicle has been used for commercial purposes in response to the ratio being less than a threshold ratio.

These and other aspects of the invention will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Various parties other than a driver may have an interest in knowing how a vehicle is being used. For example, a manufacturer, dealer, or finance company may want to know whether a driver is complying with terms of a lease. Similarly, a fleet operator or employer may want to know whether a vehicle is being used according to terms of an operating agreement. In another aspect, a manufacturer or certified maintenance services may provide different services or vehicle configurations or settings depending on the user of a vehicle. Relying on a driver to specify the use of the vehicle may be unreliable or burdensome.

According to the present disclosure, a vehicle may include a vehicle monitoring system that may determine how a vehicle is being used. In particular, the vehicle monitoring system may determine when the vehicle is being used for commercial purposes such as driving for a ride sharing service. In general, a driving pattern for a ride sharing service may have different characteristics than typical non-commercial driving. In particular, for longer trips, non-commercial drivers tend to travel mostly in the same direction (e.g., from an origin to a destination). In contrast, drivers participating in a ride sharing service frequently change directions as they drop off a passenger and pick up a new passenger going in a different direction. In an aspect, the vehicle monitoring system may detect such differences by comparing the direction of travel for segments of a longer trip. For example, the vehicle monitoring system may compare a ratio of the most common direction of travel to another direction of travel.

Other driving patterns may also be indicative of commercial use. For example, the vehicle monitoring system may also detect long periods of below average driving speed, a large number of trips to particular locations (e.g., airports), and/or an unusually large number of trips on multiple days. The vehicle monitoring system may determine whether a detected driving pattern is indicative of non-commercial use. The vehicle monitoring system may take an action in response to detecting non-commercial use including reporting the detected use to a third party.

Figure 1:
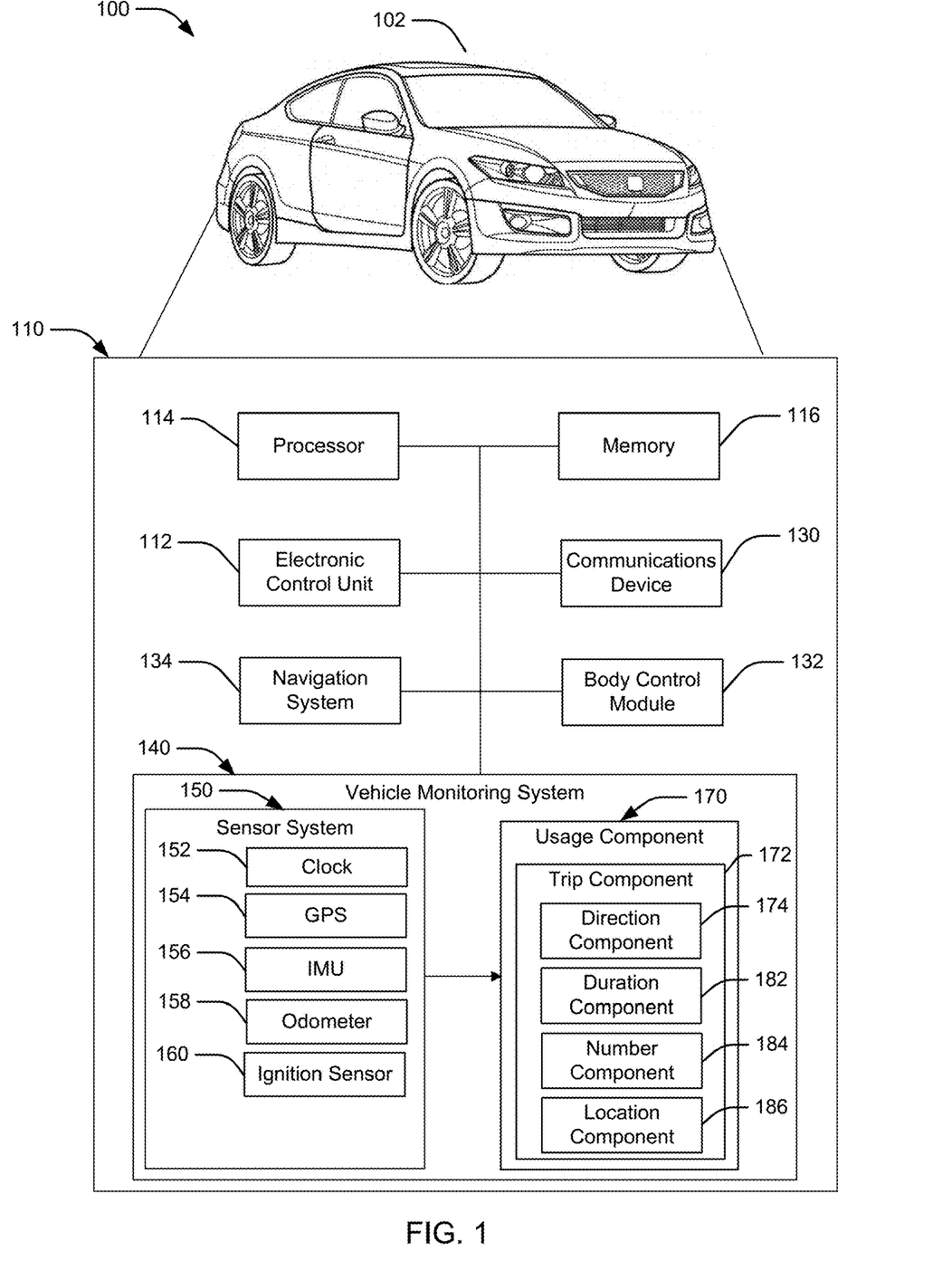
FIG. 1 illustrates a schematic view of an example operating environment of a vehicle monitoring system in accordance with aspects of the present disclosure.

Turning to FIG. 1, a schematic view of an example operating environment 100 of a vehicle 102 includes vehicle monitoring system 140. The vehicle monitoring system 140 may reside within a vehicle 102 along with other components of a vehicle control system 110. The components of the vehicle control system 110, as well as the components of other systems, hardware architectures, and software architectures discussed herein, may be combined, omitted or organized into various implementations.

The vehicle 102 may generally include an electronic control unit (ECU) 112, a processor 114, and memory 116. The ECU 112 operably controls a plurality of vehicle systems. The vehicle systems may include, but are not limited to, the vehicle control system 110 that includes the vehicle monitoring system 140, among others, including a sensor system 150, a body control module 132, a navigation system 134, vehicle HVAC systems, vehicle audio systems, vehicle video systems, vehicle infotainment systems, vehicle telephone systems, and the like. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle control system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-topoint system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include a navigation system 134 for determining a route of the vehicle 102. In an aspect, the navigation system 134 may determine high-level options for the vehicle 102. For example, the navigation system 134 may determine that the vehicle 102 should make a left turn at an intersection based on the desired destination and current location. The navigation system 134 may employ conventional route planning algorithms to select a route that minimizes distance, travel time, or other factors.

The sensor system 150 may include multiple sensors that provide input to the vehicle control system 110. In particular, the sensor system 150 may include clock 152 that determines a time and date for various events of the vehicle 102. The sensor system 150 may include one or more of a global positioning system (GPS) 154 or other satellite-based navigation system, an inertial measurement unit (IMU) 156, an odometer 158, and an ignition sensor 160. The GPS 154 may use signals received from multiple satellites to calculate a location. The IMU 156 may detect acceleration and deceleration of the vehicle 102. The odometer 158 may measure a distance traveled by the vehicle 102. The ignition sensor 160 may determine whether a vehicle engine or motor is turned on. The sensor system 150 may combine the output of multiple sensors to monitor events. For example, the sensor system may generate a trip including information regarding time from the clock 152, location and route from the GPS 154, and distance from the odometer 158. In another example, an end of a trip may be determined based on the ignition sensor 160. For example, the sensor system 150 may determine that a trip has ended when the ignition is switched off. The sensor system may generate a set of data describing the trip and provide the set of data to a usage component 170.

The sensor system 150 may provide event data to the usage component 170 that may determine how the vehicle is being used. In an aspect, the usage component 170 may be implemented at the vehicle 102. For example, the usage component 170 may include software or firmware stored in the memory 116 and executed by the processor 114. The usage component 170 may provide information regarding the usage of the vehicle 102 to an external system such as a manufacturer telematics system via the communications device 130. In another aspect, the usage component 170 may be located remotely from the vehicle 102. For example, the usage component 170 may be implemented by a processor of the manufacturer telematics system. The sensor system 150 may transmit the event data to the usage component 170 at the manufacturer telematics system.

The usage component 170 may include a trip component 172 that determines vehicle usage based on one or more trips. In particular, as explained in further detail below, the trip component 172 may include a direction component 174 that evaluates a trip based on direction of travel, a duration component 182 that evaluates a trip based on a duration of the trip, a number component 184 that evaluates vehicle usage based on a number of trips, and a location component 186 that evaluates vehicle usage based on a location of one or more trips.

Figure 2:
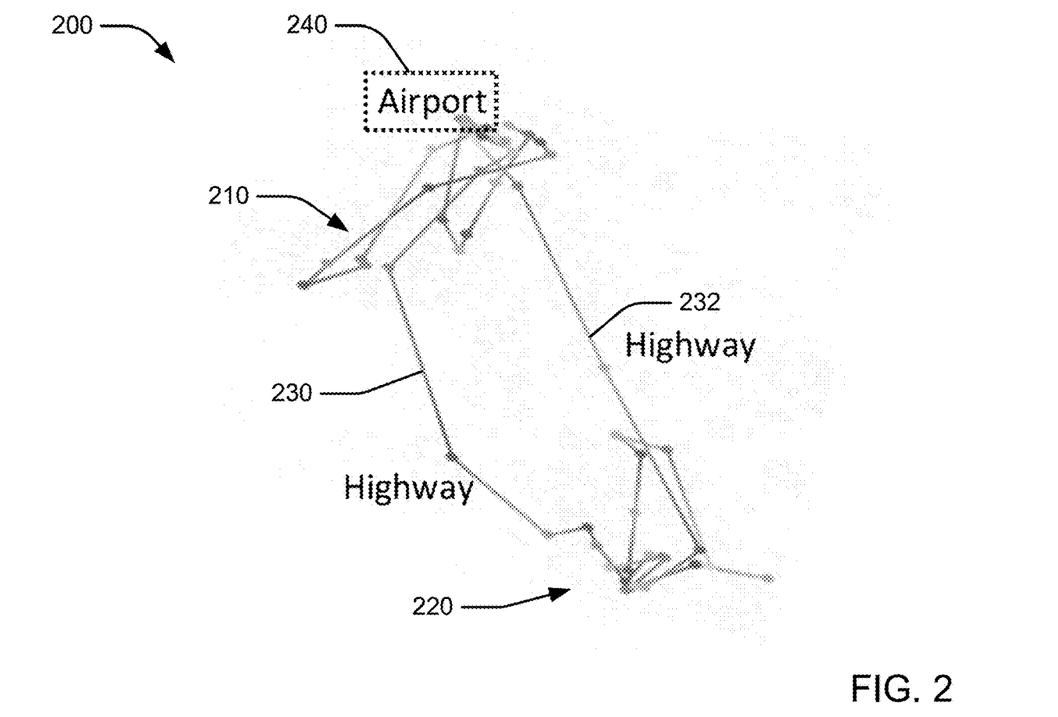
FIG. 2 illustrates a first example vehicle driving pattern for a vehicle used for a ride-share service, in accordance with aspects of the present disclosure.

FIG. 2 illustrates a first example vehicle driving pattern 200 for a vehicle (e.g., vehicle 102) used for a ride-share service. The driving pattern 200 may be determined by the sensor system 150. For example, the sensor system 150 may periodically (e.g., every 10 minutes) determine a location of the vehicle 102. The periodic locations of the vehicle 102 are shown as dots. The lines connect consecutive locations to show segments of a trip.

In the example vehicle driving pattern 200, there are two areas 210, 220 where the vehicle 102 picks up and drips off passengers. Several segments (e.g., highways 230, 232), where the vehicle 102 moves at a higher speed, connect the two areas 210, 220, but the majority of the driving is done at lower speeds in generally circular patterns. The vehicle driving pattern 200 is typical of a ride-share service, where a majority of trips are local trips. A ride share driver typically picks up a passenger, travels to a destination (e.g., airport 240), then accepts another passenger with a nearby pickup location. Also, the vehicle ignition remains on while there are multiple changes in direction.

Figure 3:
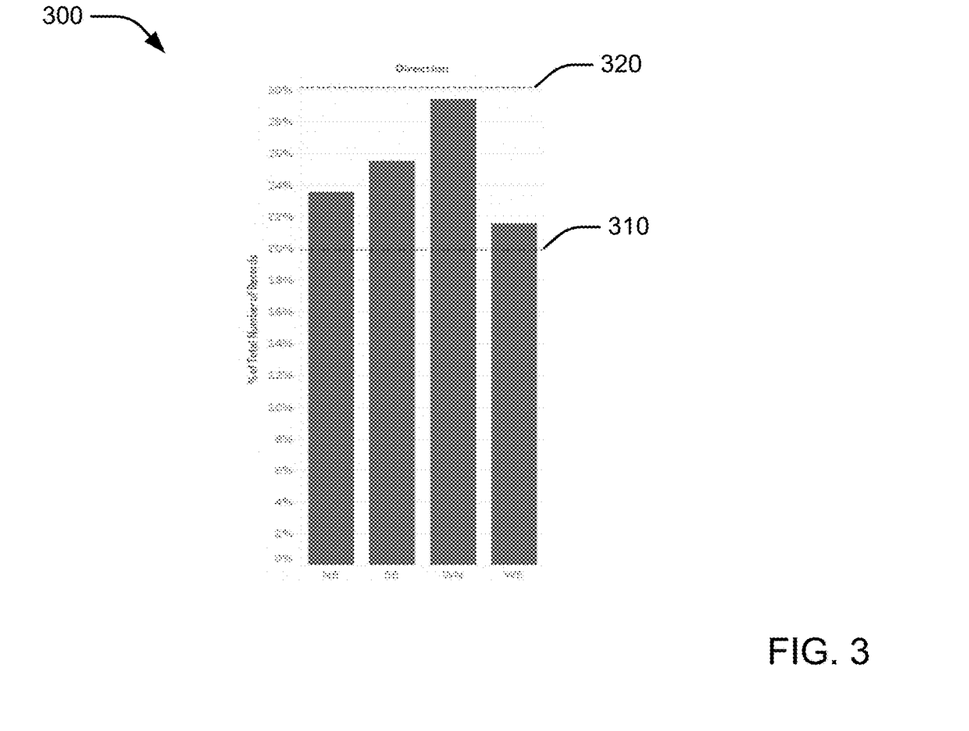
FIG. 3 is a chart showing direction of travel for the first example vehicle driving pattern of FIG. 2.

FIG. 3 is a chart 300 showing direction of travel for the example vehicle driving pattern of FIG. 2. The direction of travel for each segment may be categorized into a set of ranges. For example, the ranges may be quadrants (e.g., NE, SE, NW, SW), but other range sizes (e.g., octants) or central directions (e.g., N, S, E, W) may be used. The chart 300 shows that the driving pattern 200 does not have a dominant direction of travel. Instead a percentage of each direction of travel is between a lower threshold 310 (e.g., 20%) and an upper threshold 320 (e.g., 30%). Accordingly, a ratio of a most common direction (e.g., NW) to a second most common direction (e.g., SE) is relatively small (e.g., approximately 1.2). In an aspect, a ratio less than a threshold (e.g., 1.5) may be considered indicative of commercial use.

Figure 4:
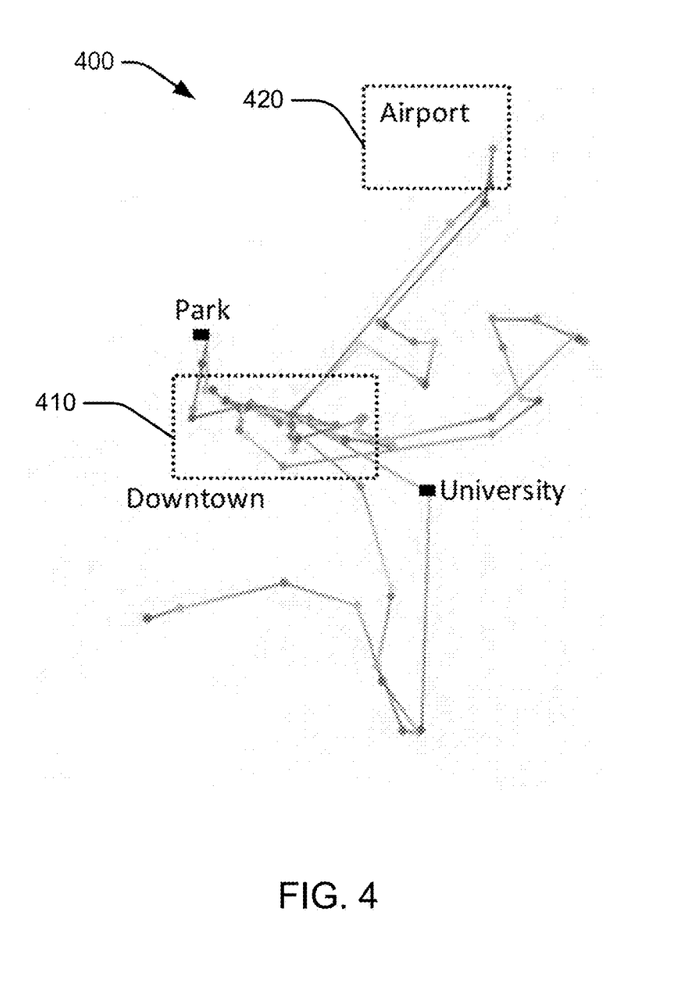
FIG. 4 illustrates a second example vehicle driving pattern for a vehicle used for a ride-share service, in accordance with aspects of the present disclosure.

FIG. 4 illustrates a second example vehicle driving pattern 400 for a vehicle used for a ride-share service. As before, periodically determined locations are marked with dots and lines represent driving segments connecting the locations. The driving pattern 400 has one central downtown area 410 where the vehicle 102 picks up passengers and several remote locations (e.g., airport 420) where the vehicle 102 drops off the passenger, then returns to the central area. Accordingly, driving pattern 400 is also typical of ride-share services.

Figure 5:
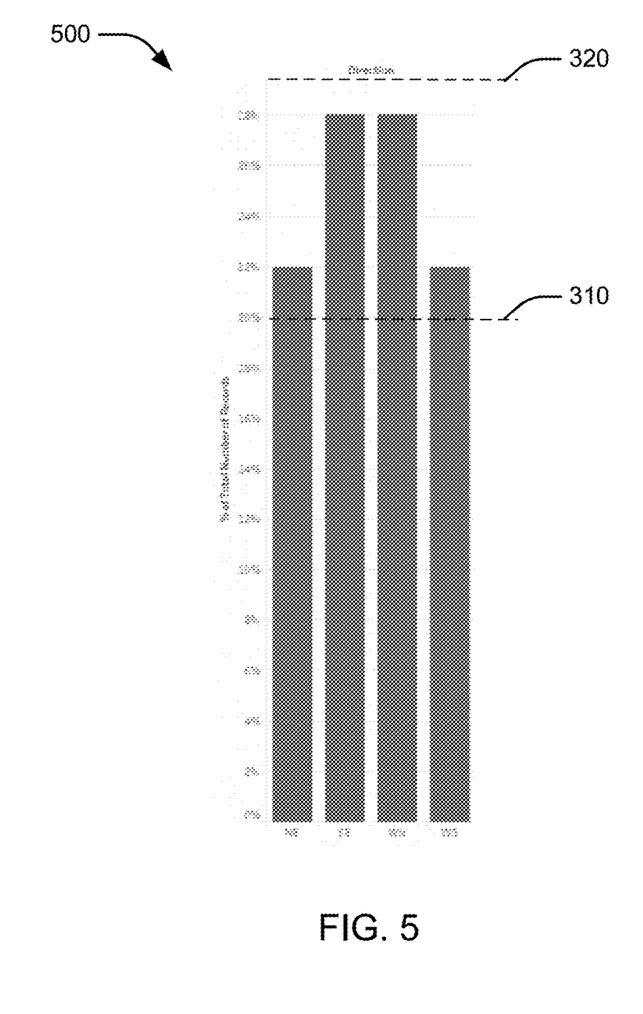
FIG. 5 is a chart showing direction of travel for the second example vehicle driving pattern of FIG. 4.

FIG. 5 is a chart 500 showing direction of travel for the example vehicle driving pattern 400. Once again, each direction of travel is within the lower threshold 310 and the upper threshold 320. Since the driving pattern 400 involves return trips along reverse routes, the most common direction and the second most common direction are opposite directions and are approximately equal. Therefore, the ratio of the most common direction to the second most common direction would be approximately 1, which is less than a threshold.

Figure 6:
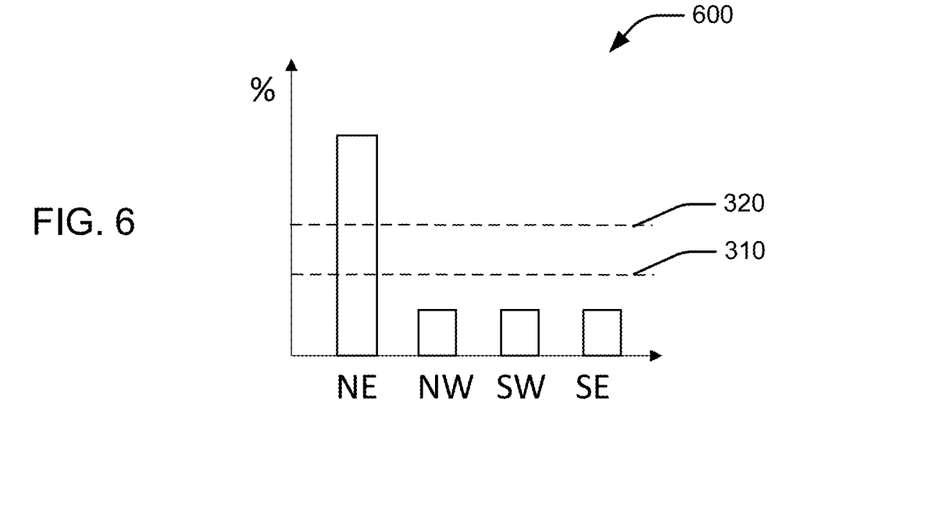
FIG. 6 is a chart showing direction of travel for an example trip to a destination.

FIG. 6 is a chart 600 showing direction of travel for an example trip to a destination. For example, the trip may have at least a threshold duration (e.g., 2 hours). A typical driver generally travels in the primary direction (e.g., NE), but may have several segments in other direction (e.g., exits, on-ramps, and connector roads). The ratio of the primary direction (i.e., the most common direction) to a second most common direction may greater than a threshold. For example, the ratio for the chart 600 is approximately 5. Viewed another way, the percentage for the primary direction may be greater than the upper threshold 320, and the percentage for the other directions may be less than the lower threshold 310.

Figure 7:
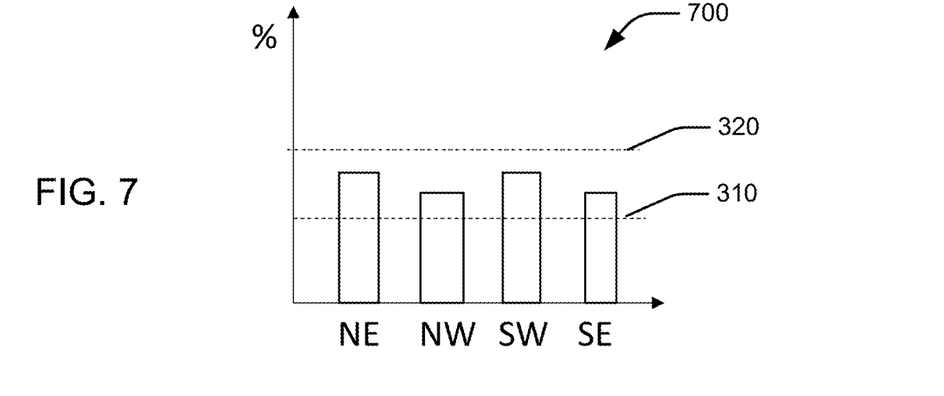
FIG. 7 is a chart showing direction of travel for a trip making multiple ride-share segments.

FIG. 7 is a chart 700 showing direction of travel for a trip making multiple ride-share segments. Similar to FIG. 3, the percentage for each of the directions of travel may be between the lower threshold 310 and the upper threshold 320.

Figure 8:
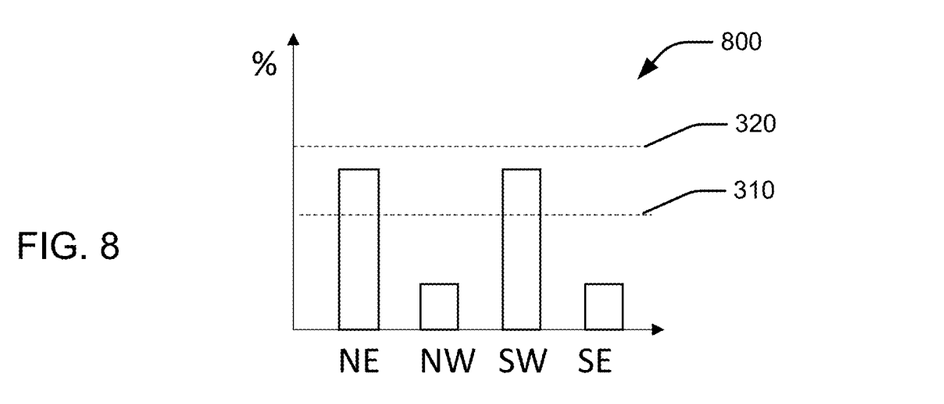
FIG. 8 is a chart showing direction of travel for a trip including multiple segments between two locations.

FIG. 8 is a chart 800 showing direction of travel for a trip including multiple segments between two locations. The chart 800 may be a more extreme example of the chart 500. For example, the ride-share vehicle may be used primarily for driving between popular destinations (e.g., an airport and a hotel district). Since such a driving pattern involves return trips in the opposite direction, the most common direction and second most common direction may have similar percentages, even if the other directions are less than the lower threshold 310.

Figure 9:
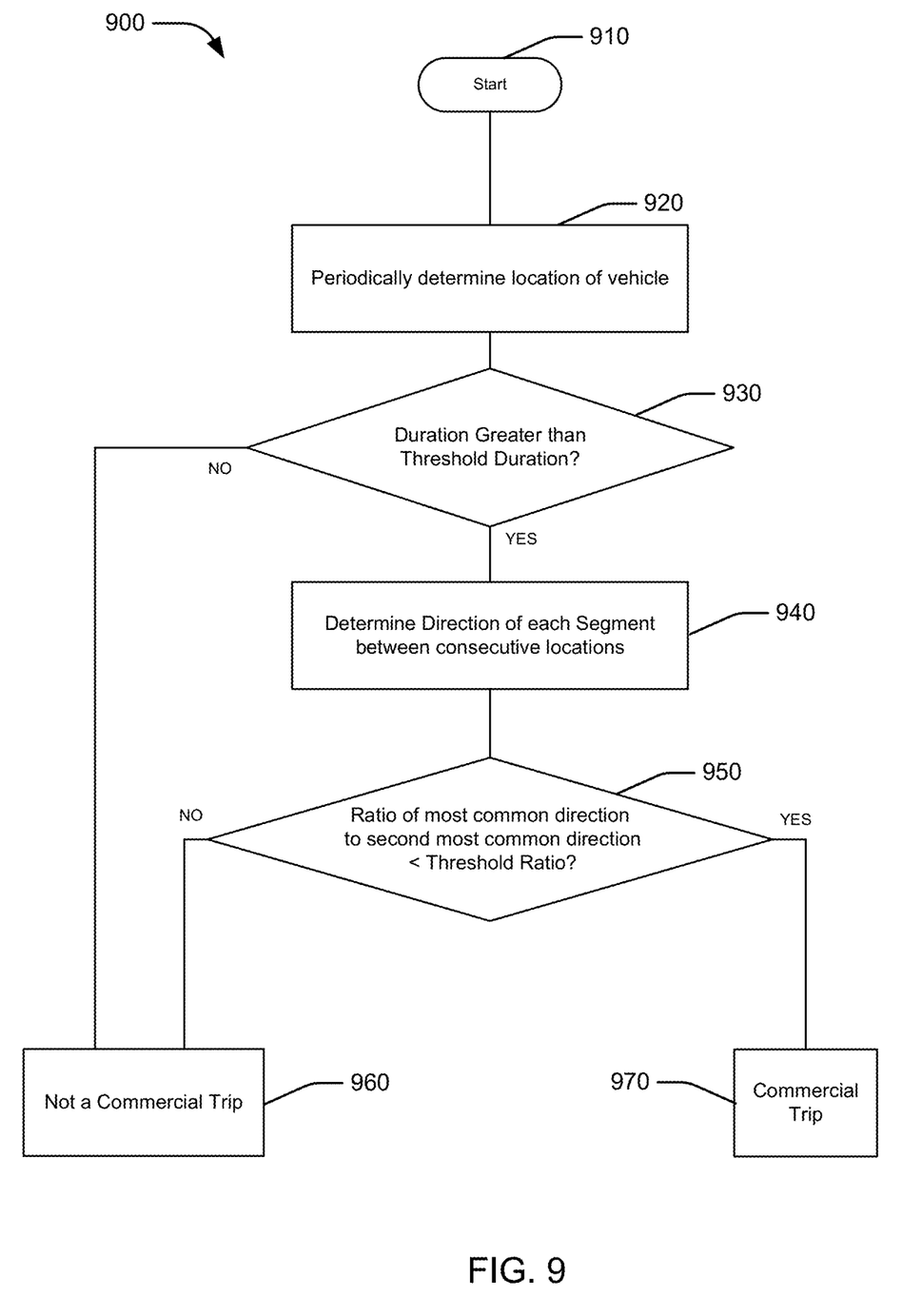
FIG. 9 is a flow diagram showing an example method for determining whether a trip is a commercial trip, in accordance with aspects of the present disclosure.

FIG. 9 is a flow diagram showing an example method 900 for determining whether a trip is a commercial trip. The method 900 may start at block 910, and proceed to block 920, where the sensor system 150 may periodically determine the location of the vehicle 102. In an aspect, the location of the vehicle may be determined based on a time interval (e.g. 1-10 minutes). In other aspects, the location may be periodically determined based on driving distance. The sensor system 150 may provide a set of locations and time of the location to the usage component 170.

At block 930, the usage component 170 and/or the duration component 182 may determine whether the duration of the trip is greater than a threshold duration. For example, the duration may be determined based on the ignition sensor 160. The duration may include the entire time that the vehicle ignition is on. Generally, ride-share usage is for a longer duration (e.g., at least two hours). For shorter duration trips, non-commercial use (e.g., dropping a child off at school and returning along the same route) may have similar driving patterns as commercial use, so such shorter trips may be excluded. If the trip duration is less than or equal to the threshold, at block 960, the usage component 170 may determine that the trip is not a commercial trip. If the trip is longer than the threshold duration, the method 900 may proceed to block 940.

At block 940, the usage component 170 and/or the direction component 174 may determine a direction of each segment between consecutive locations. As noted above, the direction may be a range of directions (e.g., quadrant or octant). The direction component 174 may determine a percentage of the segments in each direction. The direction component 174 may also determine a ratio of the most common direction to a second most common direction.

At block 950, the usage component 170 and/or the direction component 174 may determine whether the ratio of the most common direction to a different direction is less than a threshold ratio. For example, the different direction may be the second most common direction of travel or a least common direction of travel. If the ratio is less than the threshold ratio, at block 970, the usage component 170 may determine that the trip is a commercial trip. In contrast, if the ratio is greater than or equal the threshold ratio, the usage component 170 may determine that the trip is a non-commercial trip.

Figure 10:
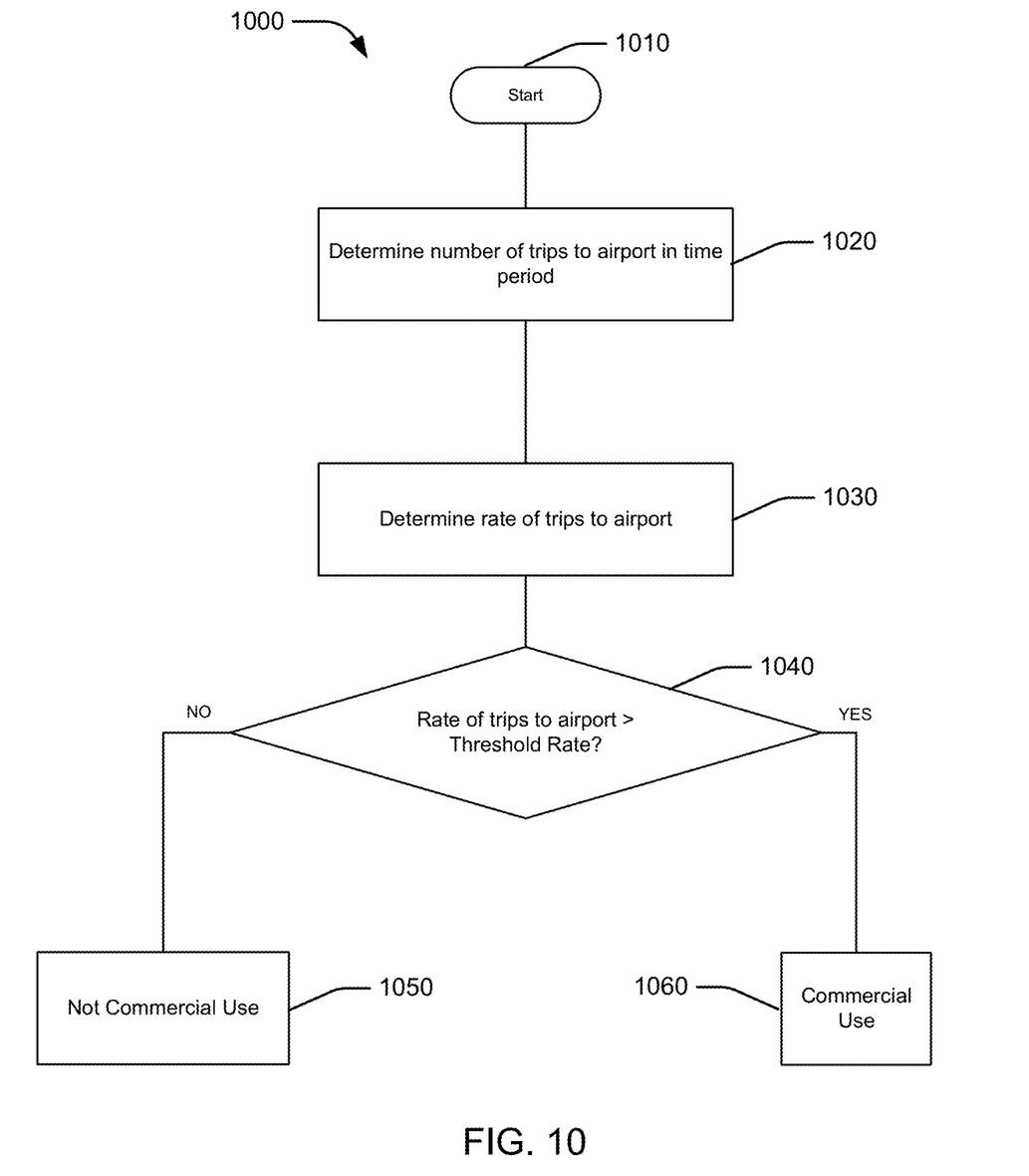
FIG. 10 is a flow diagram showing a first example method for determining whether a vehicle is being used for commercial purposes, in accordance with aspects of the present disclosure.

FIG. 10 is a flow diagram showing an example method 1000 for determining whether a vehicle is being used for commercial purposes based on location. In particular, frequent trips to an airport (e.g., airport 420) or more specifically a waiting area of the airport may be indicative of ride-share usage of the vehicle. The method 1000 may begin at block 1010 and proceed to block 1020, wherein the usage component 170 and/or the location component 186 may determine a number of trips to an airport within a time period. For example, the airport may be defined by a set of geographic coordinates. In an aspect, the coordinates may be a particular zone of an airport such as a ride-share waiting area, cell phone lot, or other designated waiting area. At block 1030, the location component 186 may determine a rate of trips to the airport. For example, the location component 186 may divide the number of trips by the time period. At block 1040, the location component 186 may determine whether the rate of trips to the airport is greater than a threshold rate. For example, the threshold rate may be one trip per week, or five trips per month. If the rate is greater than the threshold rate, at block 1060, the location component 186 may determine that the vehicle is being used for commercial purposes. If the rate is less than or equal the threshold rate, at block 1050, the location component 186 may determine that the vehicle is not being used for commercial purposes.

Figure 11:
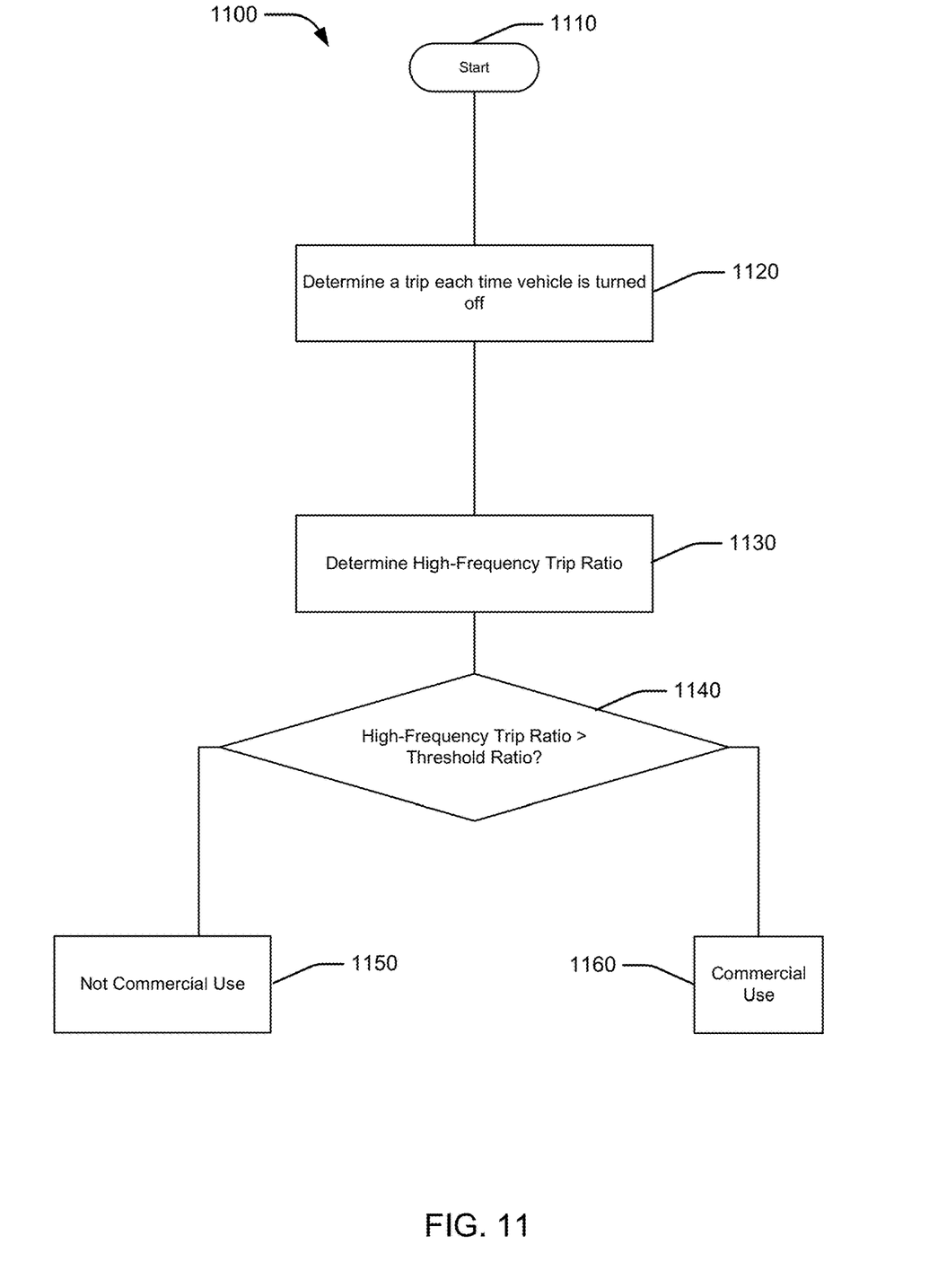
FIG. 11 illustrates a flowchart showing a second example method of determining a use of a vehicle in accordance with aspects of the present disclosure.

FIG. 11 is a flow diagram showing an example method 1100 for determining whether a vehicle is being used for commercial purposes based on a number of trips. In some cases, a ride-share driver may turn off the vehicle while waiting for another passenger. Such a driving pattern may result in a large number of trips compared to typical non-commercial use of a vehicle. The method 1100 may begin at block 1110 and proceed to block 1120, wherein the usage component 170 and/or the number component 184 may determine a trip each time the vehicle 102 is turned off. For example, the ignition sensor 160 may determine when the vehicle 102 is turned off. In block 1130, the number component 184 may determine a high-frequency trip ratio. For example, in an aspect, a high-frequency trip day may be a day where the number of trips exceeds a threshold number of trips (e.g., 10 trips per day). The ratio may be based on a number of days per week, or a number of days that the vehicle is driven. For example, a full time ride-share driver may have high-frequency trip days five days per week, and lower frequency days on days off. A part-time driver may have high-frequency trips days twice per week, but may not drive the vehicle some days. In block 1140, the usage component 170 may determine whether the high-frequency trip ratio is greater than a threshold ratio. In an aspect, the threshold ratio may be 2 days per week or 2 days for every 7 days with any trips. In block 1160, the usage component 170 may determine that the vehicle is being used for commercial purposes if the high-frequency trip ratio is greater than the threshold ratio. In block 1150, the usage component 170 may determine that the vehicle is not being used for commercial purposes if the high-frequency trip ratio is less than or equal to the threshold ratio.

Figure 12:
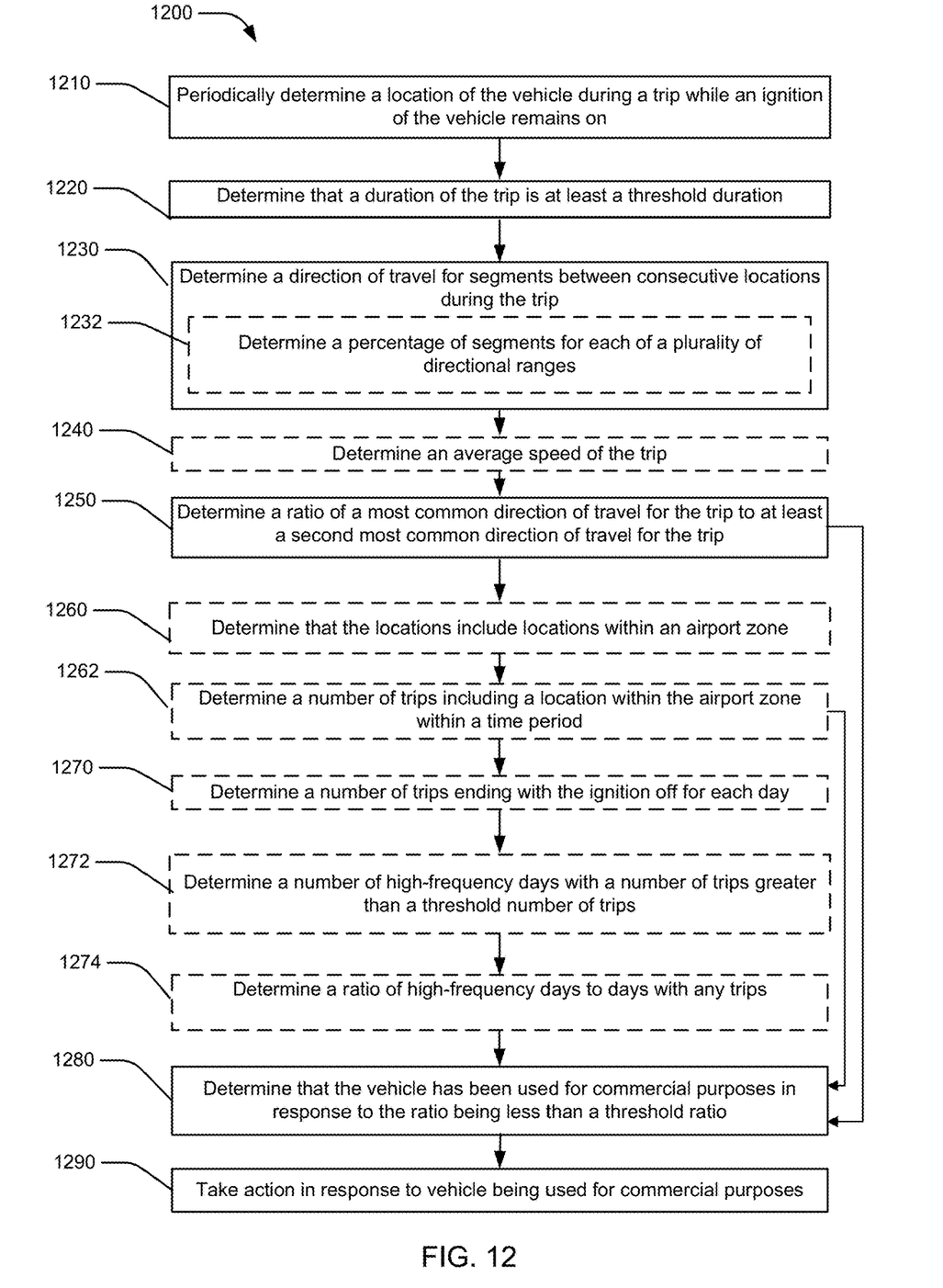
FIG. 12 illustrates a flowchart showing a third example method of determining a use of a vehicle in accordance with aspects of the present disclosure.

FIG. 12 illustrates a flowchart showing an example method 1200 of determining a use of a vehicle. In an aspect, the method 1200 may be performed by the vehicle 102 including the vehicle monitoring system 140.

At block 1210, the method 1200 may include periodically determining a location of the vehicle during a trip while an ignition of the vehicle remains on. For example, the vehicle monitoring system 140 may periodically determine a location of the vehicle 102 (e.g., via GPS 154 and/or odometer 158) during a trip while an ignition of the vehicle remains on. The ignition sensor 160 may determine when the ignition of the vehicle is on. The sensor system 150 may store the vehicle trip data in the memory 116 and/or transmit the vehicle trip data to an external system via the communications device 130.

At block 1220, the method 1200 may include determining that a duration of the trip is at least a threshold duration. For example, the vehicle monitoring system 140 may execute the usage component 170 to determine that a duration of the trip is at least a threshold duration.

At block 1230, the method 1200 may include determining a direction of travel for segments between consecutive locations during the trip. For example, the vehicle monitoring system 140 may execute direction component 174 to determine a direction of travel for segments between consecutive locations during the trip. In an aspect, for example, at sub-block 1232, the block 1230 may include determining a percentage of segments for each of a plurality of directional ranges. For example, the direction component 174 may determine the percentage of segments for each of a plurality of directional ranges.

At block 1240, the method 1200 may optionally include determining an average speed of the trip. In an aspect, for example, the usage component 170 may execute the trip component 172 to determine the average speed of the trip. For example, the trip component 172 may divide a total distance determined by the odometer 158 by a total duration determined by the clock 152.

In block 1250, the method 1200 may include determining a ratio of a most common direction of travel for the trip to at least a second most common direction of travel for the trip. For example, the vehicle monitoring system 140 may execute the direction component 174 to determine the ratio of a most common direction of travel for the trip to at least a second most common direction of travel for the trip. In an aspect, the method 1200 may proceed from block 1250 directly to block 1280.

At block 1260, the method 1200 may optionally include determining that the locations include locations within an airport zone. In an aspect, for example, the location component 186 may determine that the locations include locations within an airport zone. For example, the location component 186 may compare each location to defined geographic coordinates for an airport zone. At block 1262, the method 1200 may optionally include determining a number of trips including a location within the airport zone within a time period. For example, the location component 186 may determine the number of trips including one or more locations within the airport zone within the time period. For example, the location component 186 may express the number of trips as a rate of trips to an airport zone. In an aspect, if the rate of trips to an airport zone exceeds a threshold rate, the method 1200 may proceed to block 1280.

At block 1270, the method 1200 may include determining a number of trips ending with the ignition off for each day. In an aspect, for example, the vehicle monitoring system 140 may execute the number component 184 to determine the number of trips ending with the ignition off for each day. For example, the number component 184 may determine the number of times the ignition sensor 160 indicates that the ignition is turned off per day. At block 1272, the method 1200 may include determining a number of high-frequency days with a number of trips greater than a threshold number of trips. For example, the number component 184 may determine the number of high-frequency days with the number of trips greater than the threshold number of trips. In block 1274, the method 1200 may include determining a ratio of high-frequency days to days with any trips. For example, the number component 184 may determine the high-frequency trip ratio as described above regarding FIG. 11. If the high-frequency trip ratio exceeds the threshold ratio, the method 1200 may proceed to block 1280.

In block 1280, the method 1200 may include determining that the vehicle has been used for commercial purposes. In an aspect, for example, the usage component 170 may determine that the vehicle 102 has been used for commercial purposes. In an aspect, the determination may be at least in response to determining that the ratio of most common direction of travel for the trip to the second most common direction of travel for the trip is less than a threshold ratio. The determination may additionally or alternatively be in response to determining that the average speed of the trip is less than a threshold speed, determining that the rate of trips to an airport zone is greater than a threshold rate, or determining that a ratio of high-frequency days to days with any trips is greater than a threshold high-frequency trip ratio.

In block 1290, the method 1200 may include taking an action in response to the vehicle being used for commercial purposes. In an aspect, for example, the vehicle monitoring system 140 may take the action in response to the vehicle being used for commercial purposes. In one embodiment, for example, the vehicle monitoring system 140 may configure one or more performance characteristics of the vehicle 102 based on the vehicle being used for commercial purposes. For example, the vehicle monitoring system 140 may set or recommend a fuel efficient driving mode. The system 140 can also recommend a better-fit vehicle type to the driver, based on the driving behavior of the driver. In another aspect, the vehicle monitoring system 140 may notify a driver or other party about the detected usage. For example, the vehicle monitoring system 140 may display a message on a dashboard, heads-up display, or infotainment system of the vehicle 102 indicating the detected usage. The message may also indicate whether the detected usage is in compliance with an agreement of the driver, or if any actions (e.g., acquiring specific insurance) need to be taken to comply with the agreement. As another example, a manufacturer of the vehicle may be informed of the driving behavior to assist development of more suitable interiors and HMI features for specific commercial use cases.

Figure 13:
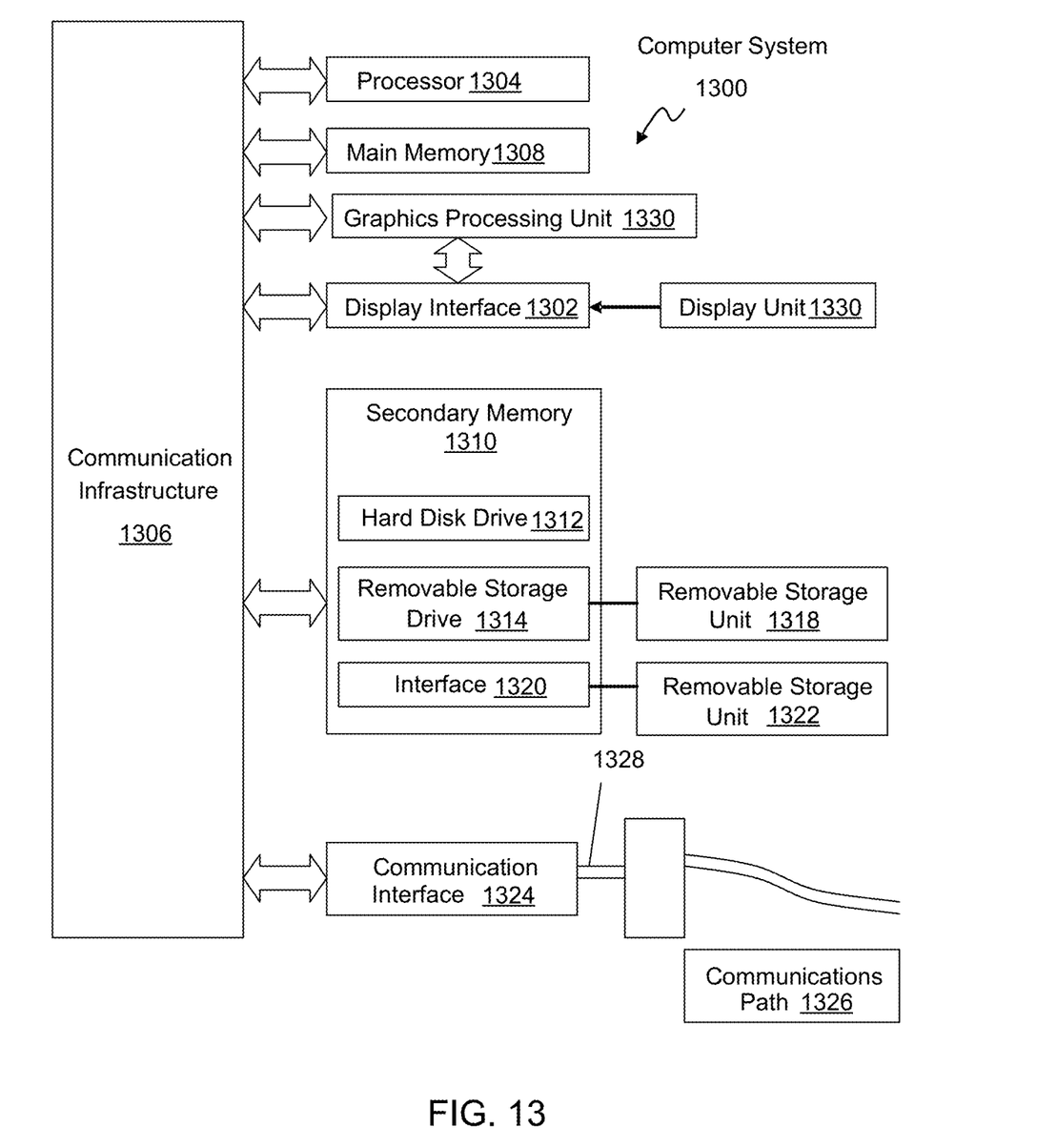
FIG. 13 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 13 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one exemplary variation, aspects of the disclosure are directed toward one or more computer systems capable of carrying out the functionality described herein. An example of such a computer system 1300 is shown in FIG. 13.

Computer system 1300 includes one or more processors, such as processor 1304. The processor 1304 is connected to a communication infrastructure 1306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 1300 may include a display interface 1302 that forwards graphics, text, and other data from the communication infrastructure 1306 (or from a frame buffer not shown) for display on a display unit 1330. Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc., which is read by and written to removable storage drive 1314. As will be appreciated, the removable storage unit 1318 includes a computer usable storage medium having stored therein computer software and/or data.

In alternative aspects, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328, which may be electronic, electromagnetic, optical or other signals capable of being received by communications interface 1324. These signals 1328 are provided to communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1314, a hard disk installed in hard disk drive 1312, and signals 1328. These computer program products provide software to the computer system 1300. Aspects of the disclosure are directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform various features in accordance with aspects of the present disclosure, as discussed herein. In particular, the computer programs, when executed, enable the processor 1304 to perform such features. Accordingly, such computer programs represent controllers of the computer system 1300.

In variations where aspects of the disclosure are implemented using software, the software may be stored in a computer program product and loaded into computer system 1300 using removable storage drive 1314, hard disk drive 1312, or communications interface 1324. The control logic (software), when executed by the processor 1304, causes the processor 1304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 14:
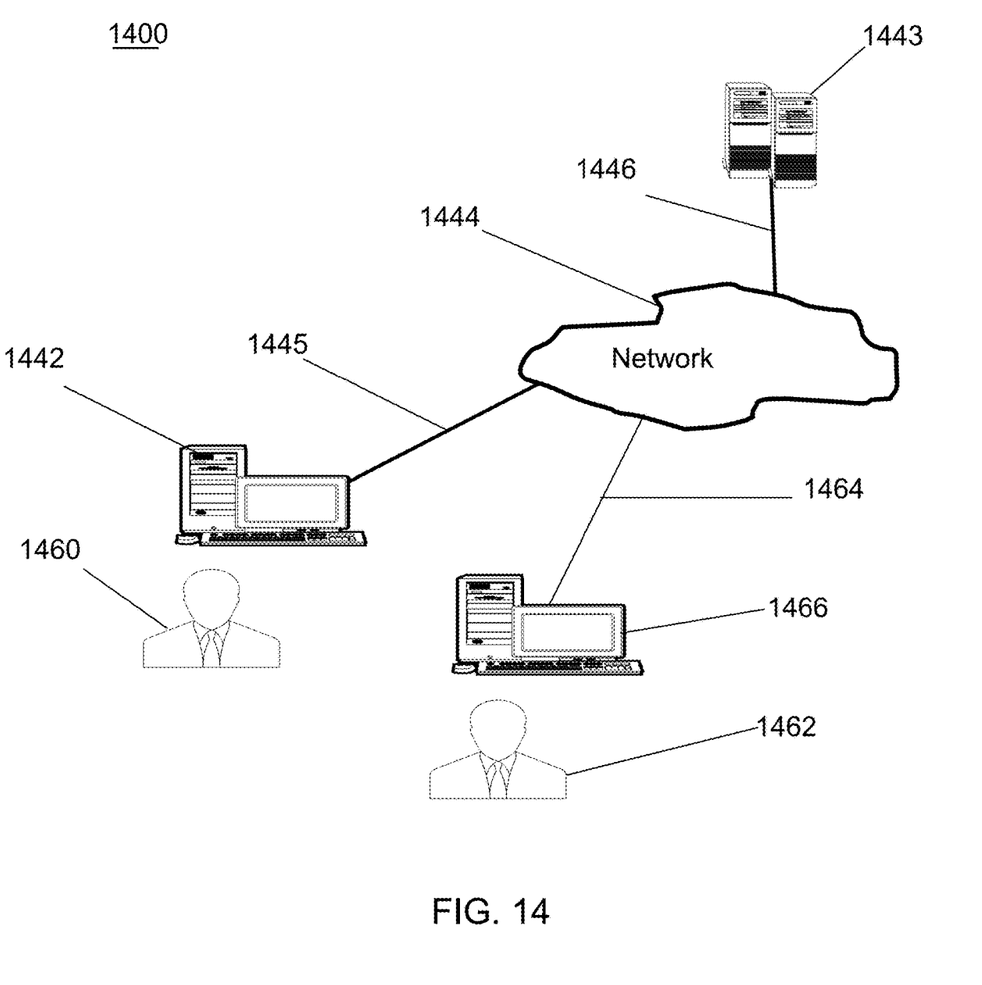
FIG. 14 is a block diagram of various exemplary system components, for use in accordance with aspects of the present disclosure.

FIG. 14 is a block diagram of various example system components that may be used in accordance with aspects of the present disclosure. For example, the various components may be within the vehicle 102, or only some of the components may be within the vehicle 102, and other components may be remote from the vehicle 102. The system 1400 includes one or more accessors 1460, 1462 (also referred to interchangeably herein as one or more "users") and one or more terminals 1442, 1466 (such terminals may be or include, for example, various features of the vehicle control system 110). In one aspect, data for use in accordance with aspects of the present disclosure is, for example, input and/or accessed by accessors 1460, 1462 via terminals 1442, 1466, such as personal computers (PCs), minicomputers, mainframe computers, microcomputers, telephonic devices, or wireless devices, such as personal digital assistants ("PDAs") or a hand-held wireless devices coupled to a server 1443, such as a PC, minicomputer, mainframe computer, microcomputer, or other device having a processor and a repository for data and/or connection to a repository for data, via, for example, a network 1444, such as the Internet or an intranet, and couplings 1445, 1446, 1464. The couplings 1445, 1446, 1464 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of determining usage of a vehicle, comprising, by a processor of the vehicle:

periodically determining, based on a global positioning system receiver located in the vehicle, a location of the vehicle during a trip while an ignition of the vehicle remains on;

determining based on a time that the ignition of the vehicle remains on, that a duration of the trip is at least a threshold duration;

determining a direction of travel for segments of the trip between consecutive locations during the trip;

determining a first ratio of a most common direction of travel for the trip to at least a different direction of travel for the trip, wherein determining the first ratio comprises determining a percentage of the segments of the trip for each of a plurality of directional ranges;

determining a number of trips ending with the ignition off for each day;

determining a number of high-frequency days with a number of trips greater than a threshold number of trips;

determining a second ratio of high-frequency days to days with any trips;

determining that the vehicle has been used for commercial purposes in response to the first ratio being less than a threshold ratio and the second ratio of high frequency days to days with any trips being greater than a second threshold ratio; and displaying a message on a display of the vehicle to a party other than a driver of the vehicle indicating that the vehicle has been used for commercial purposes.

2. The method of claim 1, wherein the plurality of directional ranges are four directional quadrants.

3. The method of claim 1, wherein the different direction of travel is a second most common direction of travel or a least common direction of travel.

4. The method of claim 1, wherein the threshold duration is at least 1 hour.

5. The method of claim 4, wherein the threshold duration is 2 hours.

6. The method of claim 1, further comprising determining an average speed of the trip, wherein determining that the vehicle has been used for commercial purposes is also in response to determining that the average speed is less than a threshold speed.

7. The method of claim 6, wherein the threshold speed is between 20 and 30 miles per hour.

8. The method of claim 6, wherein the threshold speed is based on an average driving speed in a region including the locations.

9. The method of claim 1, further comprising:
determining that the locations include at least one location within an airport zone; and
determining a number of trips including the at least one location within the airport zone within a time period,
wherein determining that the vehicle has been used for commercial purposes is in response to determining that a rate of trips including the at least one location within the airport zone is greater than a threshold rate.

10. An apparatus for determining usage of a vehicle, comprising:
a global positioning system receiver located in the vehicle configured to periodically determine a location of the vehicle during a trip while an ignition of the vehicle remains on;
a memory; and
at least one processor coupled to the memory and the global positioning system receiver and configured to:

determine, based on a time that the ignition of the vehicle remains on, that a duration of the trip is at least a threshold duration;
determine a direction of travel for segments of the trip between consecutive locations during the trip;
determine a percentage of the segments of the trip for each of a plurality of directions of travel defined by directional ranges;
determine a first ratio of a most common direction of travel for the trip to at least a different direction of travel for the trip;
determine a number of trips ending with the ignition off for each day;
determine a number of high-frequency days with a number of trips greater than a threshold number of trips;
determine a second ratio of high-frequency days to days with any trips;
determine that the vehicle has been used for commercial purposes in response to the first ratio being less than a threshold ratio and the second ratio of high frequency days to days with any trips being greater than a second threshold ratio; and
configure one or more performance characteristics of the vehicle for a fuel efficient driving mode in response to the determination that the vehicle has been used for commercial purposes.

11. The apparatus of claim 10, wherein the threshold duration is between 1 hour and 3 hours.

12. The apparatus of claim 10, wherein the plurality of directional ranges are four directional quadrants.

13. The apparatus of claim 10, wherein the at least one processor is configured to determine an average speed of the trip and determine that the vehicle has been used for commercial purposes in response to determining that the average speed is less than a threshold speed.

14. The apparatus of claim 13, wherein the threshold speed is between 20 and 30 miles per hour.

15. The apparatus of claim 10, wherein the at least one processor is configured to:
determine that the locations include locations within an airport zone; and
determine a number of trips including a location within the airport zone within a time period,
wherein determining that the vehicle has been used for commercial purposes is in response to determining that a rate of trips including locations within the airport zone is greater than a threshold rate.

16. A non-transitory computer-readable medium storing computer executable code to determine usage of a vehicle, comprising code that when executed by a processor of the vehicle, causes the processor to:
determine, by a global positioning system receiver located in the vehicle, a periodic location of the vehicle during a trip while an ignition of the vehicle remains on;
determine, based on a time that the ignition of the vehicle remains on, that a duration of the trip is at least a threshold duration;
determine a direction of travel for segments between consecutive locations during the trip;
determine a percentage of the segments of the trip for each of a plurality of directions of travel defined by directional ranges;
determine a first ratio of a most common direction of travel for the trip to at least a different direction of travel for the trip;

determine a number of trips ending with the ignition off for each day;

determine a number of high-frequency days with a number of trips greater than a threshold number of trips;

determine a second ratio of high-frequency days to days with any trips;

determine that the vehicle has been used for commercial purposes in response to the first ratio being less than a threshold ratio and the second ratio of high frequency days to days with any trips being greater than a second threshold ratio; and configure one or more performance characteristics of the vehicle for a fuel efficient driving mode in response to the determination that that the vehicle has been used for commercial purposes.

* * * * *